(12) United States Patent
Reich et al.

(10) Patent No.: US 12,025,203 B2
(45) Date of Patent: Jul. 2, 2024

(54) VIBRATION DAMPER

(71) Applicant: NEXANS, Courbevoie (FR)

(72) Inventors: Alexander Reich, Floss (DE); Stefan Segerer, Floss (DE)

(73) Assignee: NEXANS, Courbevoie (FR)

( * ) Notice: Subject to any disclaimer, the term of this patent is extended or adjusted under 35 U.S.C. 154(b) by 22 days.

(21) Appl. No.: 17/845,261

(22) Filed: Jun. 21, 2022

(65) Prior Publication Data

US 2023/0020124 A1 Jan. 19, 2023

(30) Foreign Application Priority Data

Jun. 28, 2021 (EP) .................................... 21305887

(51) Int. Cl.
*F16F 7/108* (2006.01)
*B60R 16/02* (2006.01)

(52) U.S. Cl.
CPC .......... *F16F 7/108* (2013.01); *B60R 16/0215* (2013.01); *F16F 2222/08* (2013.01); *F16F 2230/0005* (2013.01)

(58) Field of Classification Search
CPC ................... F16F 7/108; F16F 2222/08; F16F 2230/0005; B60R 16/0215
See application file for complete search history.

(56) References Cited

U.S. PATENT DOCUMENTS

| | | | |
|---|---|---|---|
| 4,452,097 A | 6/1984 | Manfred | |
| 5,639,993 A * | 6/1997 | Ideno | B60R 16/0222 174/153 G |
| 6,023,023 A | 2/2000 | Takeuchi | |
| 6,874,220 B1 | 4/2005 | Jones | |
| 8,042,839 B2 * | 10/2011 | Rammhofer | F16L 37/0985 285/215 |
| 8,136,646 B2 * | 3/2012 | Kuwayama | F16F 7/108 267/141 |
| 10,920,808 B2 * | 2/2021 | Aoyama | F16B 2/10 |
| 2007/0099503 A1 | 5/2007 | Konz | |
| 2014/0060922 A1 | 3/2014 | Weyrich et al. | |
| 2015/0208519 A1 | 7/2015 | Kawai et al. | |

(Continued)

FOREIGN PATENT DOCUMENTS

| | | | | |
|---|---|---|---|---|
| CN | 109340500 A | * | 2/2019 | ............ F16F 1/3732 |
| DE | 202017100924 U1 | * | 4/2017 | |
| EP | 1587193 A2 | * | 10/2005 | ......... B60R 16/0215 |

(Continued)

OTHER PUBLICATIONS

International Search Report dated Dec. 22, 2021.

*Primary Examiner* — Xuan Lan Nguyen
(74) *Attorney, Agent, or Firm* — Sofer & Haroun, LLP

(57) ABSTRACT

A vibration damper is proposed with two damper halves which enclose a passage opening in the assembled state and, in the installed position, bear against a component which is guided through the passage opening. The damper halves have corresponding latching means which permit an attachment of the vibration damper to the component. Each damper half has in each case one collar, which collars, in the assembled state of the vibration damper, are arranged at opposite ends of the vibration damper. The vibration damper can be mounted simply, even retrospectively. Moreover, the vibration damper can also be released again without damage.

6 Claims, 1 Drawing Sheet

(56) References Cited

U.S. PATENT DOCUMENTS

2018/0163900 A1    6/2018  Vaughn et al.

FOREIGN PATENT DOCUMENTS

| EP | 1710882 A2 | * | 10/2006 | ............... H02G 3/22 |
| EP | 3779545 A4 | * | 2/2021 | ........... G02B 6/4444 |
| JP | 2006005888 A | * | 1/2006 | |
| JP | 2008263110 A | * | 10/2008 | |

* cited by examiner

VIBRATION DAMPER

RELATED APPLICATION

This application claims the benefit of priority from EP 21 305 887.8, filed on Jun. 28, 2021, the entirety of which is incorporated by reference.

FIELD

The invention relates to a vibration damper and, in particular, to a vibration damper for damping mechanical vibrations in a wiring harness of a motor vehicle.

BACKGROUND

In the following text, the term "vibration" is always to be understood to mean a mechanical vibration of a component or an acoustic vibration in the air which is excited by way of a vibrating component.

During operation of a motor vehicle, mechanical vibrations of different frequencies occur which are produced, for example, during operation of an internal combustion engine. Vibrations can also be caused, however, by way of wheels of a vehicle rolling on an underlying surface which is not completely smooth. These vibrations can generate resonance vibrations in components of a motor vehicle, which resonance vibrations are disruptive as far as into the vehicle interior compartment. Inter alia, disruptive vibrations of this type can also be produced in the wiring harnesses which are installed for signal and/or energy transmission in motor vehicles.

US 2003/0042086 A1 has disclosed a vibration damper for a rotating shaft. The vibration damper is of two-part construction, the halves of the vibration damper being held together by a cylindrical housing which is pushed on the outside over the halves of the vibration damper. In each case one mass core made from steel is accommodated in the interior of the halves of the vibration damper, which mass core is encapsulated by an elastomer. On account of the cylindrical housing, the vibration damper cannot be mounted on a shaft retrospectively.

OBJECTS AND SUMMARY

Proceeding herefrom, it is the object of the present invention to provide a vibration damper which is simple to mount, in order to overcome or at least to improve one or more of the problems mentioned at the outset.

In order to achieve this object, the invention in accordance with the first aspect proposes a vibration damper with two damper halves which enclose a passage opening in the assembled state and, in the installed position, bear against a component which is guided through the passage opening. The damper halves have corresponding latching means which permit an attachment of the vibration damper to the component. Each damper half has in each case one collar, which collars, in the assembled state of the vibration damper, are arranged at opposite ends of the vibration damper.

The collars make the fixing of the vibration damper on the component, for example by way of cable ties, possible. This type of fixing has the advantage that no housing or the like is necessary, in order to hold the damper halves together at an installation location. The damper halves make it possible, furthermore, that retrofitting with the vibration damper according to the invention is made possible, for example, in relatively old vehicles. Furthermore, the vibration damper can also be released again without damage. The vibration damper ensures that disruptive vibrations and the noise caused as a result are suppressed. This is a particularly desired property, in particular, in the case of applications in vehicles.

In the case of one advantageous development of the vibration damper, the collar which is arranged on the damper halves has one and preferably two windows.

During mounting, a band, for example a cable tie, can be plugged through the windows, in order to fix the vibration damper at its installation location. The cable tie can also be released again without destruction in this way.

In the case of one development of the vibration damper, each damper half has in each case two collars, one of the collars being longer in the axial direction of the vibration damper than the other collar.

Latching hooks are advantageously arranged on the longer collar.

In the case of one expedient development of the vibration damper, in the assembled state of the vibration damper, the latching hooks on the longer collar of the one damper half engage into latching openings of the other damper half which are provided in the shorter collar.

The damper halves can advantageously in each case have a central portion, on which latching hooks and latching openings are provided in pairs.

The latching hooks and latching openings together form latching means which allow the damper halves to be latched to one another at a desired location and to attach the vibration damper on the component at this location. An installer then has his/her hands free, in order to finally fix the vibration damper, for example, by means of cable ties which are guided through apertures in the long collars and are placed around the component. In the case of other exemplary embodiments, other latching means or other connecting means are provided which allow an attachment of the vibration damper, with the result that the damper halves are not released from one another again and can be fixed on the component without difficulty, for example by way of a cable tie. Other connecting means instead of the latching means can be, for example, adhesive surfaces on the inner side of the damper halves.

In the case of one advantageous embodiment of the vibration damper, at least one of the damper halves has a core made from metal which is provided with a moulded plastic encapsulation, in particular made from thermoplastic.

Overmoulding with the thermoplastic protects the component against abrasion by way of the vibration damper.

BRIEF DESCRIPTION OF THE DRAWING

In the following text, the invention will be explained in greater detail by way of example on the basis of two embodiments with reference to the appended figures. All the figures are purely diagrammatic and not to scale. In the figures.

Identical or similar elements are provided in the figures with identical or similar reference numerals.

DETAILED DESCRIPTION

Figure 1:
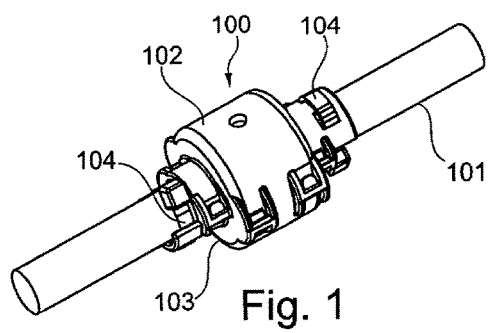
FIG. 1 shows a perspective view of one exemplary embodiment of a vibration damper according to the invention.

FIG. 1 shows a perspective view of one exemplary embodiment of a vibration damper 100 according to the invention. The vibration damper is arranged on an electric line 101 which is shown in a simplified manner as a rod in FIG. 1. In the case of another exemplary embodiment, a wiring harness or another elongate component might replace the line 101. The vibration damper 100 comprises a first damper half 102 and a second damper half 103 which enclose the line 101. The damper halves 102, 103 are fixed on the line 101 by way of cable ties 104. The longitudinal extent of the line 101 defines a direction which is called an axial direction in the following text.

Figure 2:
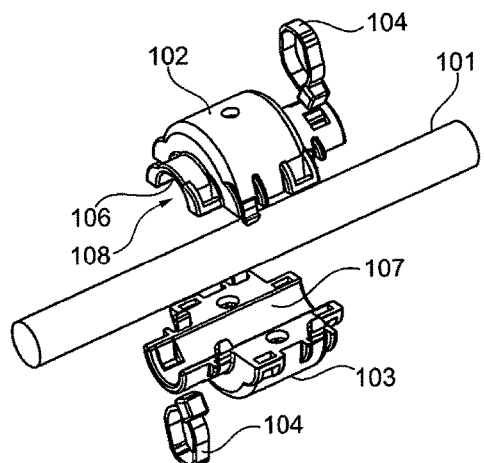
FIG. 2 shows an exploded illustration of the vibration damper from FIG. 1.

FIG. 2 shows the vibration damper 100 in an exploded illustration. It can be seen in FIG. 2 that the damper halves 102, 103 have substantially a semi-cylindrical design. The damper halves 102, 103 have inner shell faces 106, 107 which, in the assembled state of the vibration damper 100, bear against an outer circumference of the line 101.

Figure 3:
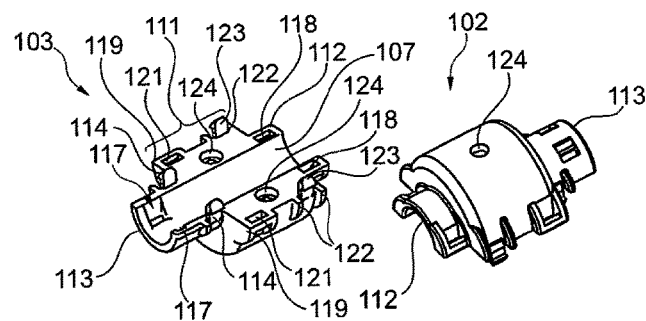
FIG. 3 shows a perspective view of damper halves of the vibration damper from FIG. 1.

FIG. 3 shows a perspective view of the damper halves 102, 103, the construction of which is identical. Therefore, only the damper half 103 is described in the following text representatively for the two damper halves 102, 103. The damper half 103 has a central portion 111 which is adjoined on one side by a short semi-circular collar 112 and on the other side by a long semi-circular collar 113. Latching hooks 114 are arranged on the long collar 113 so as to adjoin the central portion 111. At the end which lies away from the central portion 111, two apertures 117 which lie opposite one another are configured in the long collar 113. Latching openings 118 are provided in the short collar 112 in a manner which is adjacent to the central portion 111.

A pair of projections 119 are configured in the central portion 111, which projections 119 adjoin the long collar 113 and are provided with latching openings 121. Adjacently with respect to the short collar 112, two projecting brackets 122 are provided on the central portion 111 on each side of the damper half 103, between which brackets 122 in each case one latching hook 123 is arranged. The damper half 103 has openings 124, the function of which will be explained with reference to FIGS. 4A and 4B.

The damper half 103 is shown in FIG. 3 in a view on its inner side, while the observer views the outer side of the damper half 102. During the mounting of the vibration damper on the line 101, the damper halves 102, 103 are placed onto one another in such a way that the short collar 112 of the damper half 102 comes to lie on the long collar 113 of the damper half 103, and the long collar 113 of the damper half 102 comes to lie on the short collar 112 of the damper half 103. Here, in each case the latching hooks 114 engage into the latching openings 118, and the latching hooks 123 engage into the latching openings 121. This situation is shown in FIG. 1. The latching hooks 114, 123 and latching openings 118, 121 together form latching means which allow the damper halves 102, 103 to be latched to one another at a desired location and to attach the vibration damper on the line 101 at this location. An installer then has his/her hands free, in order to finally fix the vibration damper 100 by means of cable ties 104 which are guided through the apertures 117 in the long collars 113 and are placed around the line 101.

Figures 4A, 4B:
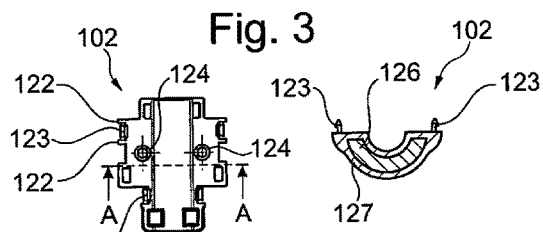
FIG. 4A shows a plan view of an inner side of the damper half from FIG. 3.
FIG. 4B shows a cross section through the damper half from FIG. 4A.

FIG. 4A shows the damper half 102 in a plan view on its inner side, and FIG. 4B shows a cross section through the damper half 102 which is shown in FIG. 4A, along the line A-A in FIG. 4A. In the damper half 102, a metal insert 126 is arranged as mass core which is overmoulded by a thermoplastic 127. The openings 124 in the damper half 102 serve the purpose of fixing the metal insert 126 in an injection moulding die. In the case of the exemplary embodiment which is described, the metal insert 126 is produced from steel which is coated with an anti-corrosion protection means. In the case of other exemplary embodiments, other metals or materials which have a desired density can also be used.

Figures 4C, 4D:
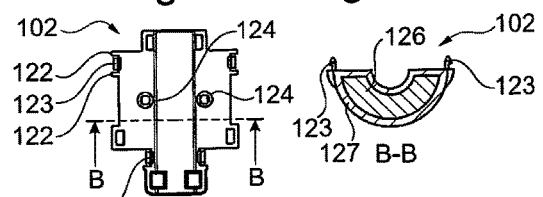
FIG. 4C shows a plan view of an inner side of a damper half of another embodiment of a vibration damper according to the invention.
FIG. 4D shows a cross section through the damper halves from FIG. 4C.

FIG. 4C shows another embodiment of the damper half 102 which is of longer configuration than the damper half 102 from FIG. 4A. In a manner which corresponds to FIG. 4B, FIG. 4D shows a cross section through the damper half 102 which is shown in FIG. 4C, along the line B-B in FIG. 4B. The damper half 102 from FIG. 4C is not only longer than the damper half from FIG. 4A, but rather the metal insert 126 is also of thicker configuration than the metal insert 126 of the damper half 102 which is shown in FIG. 4B. The vibration damper 100 according to the invention can be scaled in a simple way by way of these structural amendments, that is to say different sizes and masses of the vibration damper 100 can be realised in a simple way, without changing anything in the fundamental construction of the vibration damper.

It is in principle also possible for a plurality of structurally identical or different vibration dampers 100 to be arranged on a line 101, in order in this way to realise different damping properties.

For maintenance work, the vibration damper 100 can be dismantled easily, by the cable ties 104 being cut and the latching connection being opened. After repair, for example, the same vibration damper can then be reused again without problems, destruction-free and/or damage-free dismantling of the vibration damper being required for this purpose.

LIST OF REFERENCE NUMERALS

100 Vibration damper
101 Line
102,103 Damper half
104 Cable tie
106,107 Shell faces
111 Central portion
112 Short collar
113 Long collar
114 Latching hooks
117 Apertures
118 Latching openings
119 Projections
121 Latching openings
122 Brackets
123 Latching hooks
124 Openings
126 Metal insert
127 Moulded plastic encapsulation

The invention claimed is:

1. A vibration damper comprising:
   first and second damper halves which enclose a passage opening in the assembled state and, in the installed position, bear against a component which is guided through the passage opening,
   the first and second damper halves having corresponding first and second latching means which permit an attachment of the vibration damper to the component, said first and second damper halves having, in each case, one long and one short collar, wherein said collars, in the assembled state of the vibration damper, are arranged at opposite ends of the vibration damper,
   wherein the long collar is longer in an axial direction of the vibration damper than the short collar,
   wherein in the assembled state of the vibration damper, in each case, one long and one short collar bear against one another,
   wherein two apertures, which lie opposite one another, are configured in the long collar,
   wherein collar latching hooks are arranged on the long collar, and
   wherein in the assembled state of the vibration damper, the collar latching hooks on the long collar of the first damper half engage into collar latching openings of the second damper half which are provided in the short collar.

2. The vibration damper according to claim 1, wherein the collars which are arranged on the first and second damper halves have the collar latching openings.

3. The vibration damper according to claim 1, wherein the first and second damper halves in each case have a central portion, on which central latching hooks and central latching openings are provided in pairs.

4. The vibration damper according to claim 1, wherein at least one of the first and second damper halves has a core made from metal which is provided with a moulded plastic encapsulation.

5. The vibration damper according to claim 1, wherein the collars which are arranged on the first and second damper halves have two of the collar latching openings.

6. The vibration damper according to claim 1, wherein at least one of the first and second damper halves has a core made from metal which is provided with a moulded thermoplastic encapsulation.

* * * * *